Oct. 19, 1943.  H. LIEBERHERR  2,332,092
HORIZONTAL INTERNAL COMBUSTION ENGINE
Filed May 27, 1942
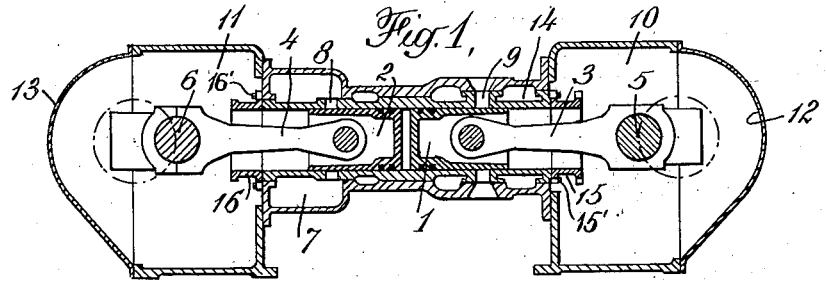
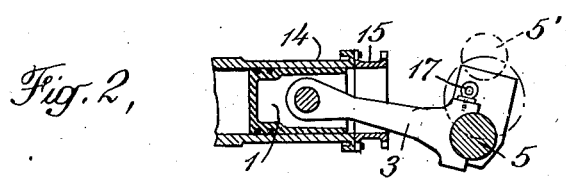
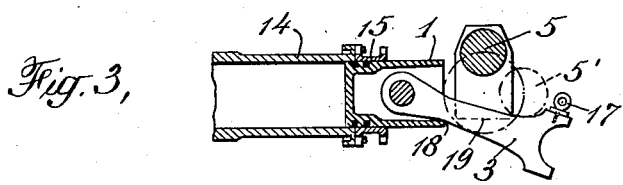
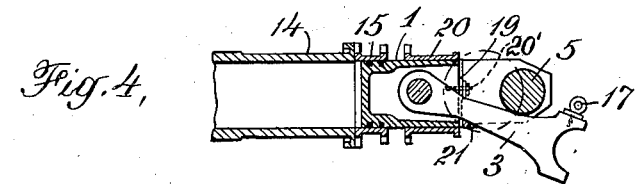
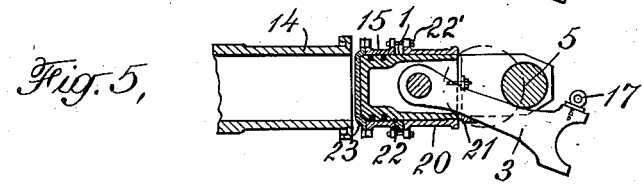
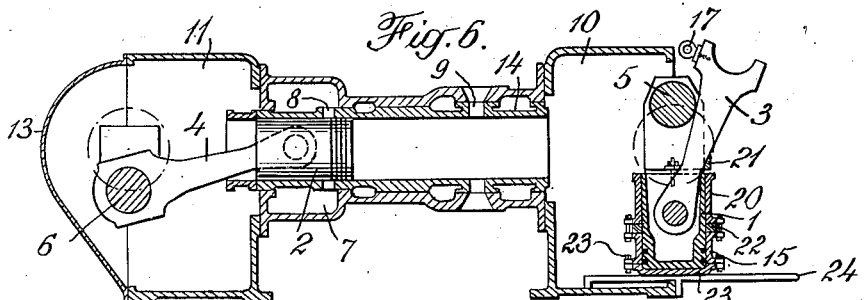
INVENTOR
HANS LIEBERHERR
BY
ATTORNEYS Patented Oct. 19, 1943

2,332,092

UNITED STATES PATENT OFFICE 2,332,092

HORIZONTAL INTERNAL COMBUSTION ENGINE

Hans Lieberherr, Winterthur, Switzerland, assignor to Sulzer Frères, Société Anonyme, Winterthur, Switzerland Application May 27, 1942, Serial No. 444,680
In Switzerland October 21, 1941

1 Claims. (Cl. 123—51)

The invention relates to a horizontal internal combustion engine and is characterized by a device for attaching the piston to the crank in such a way that the piston can be swung in and out by turning the crank. The purpose of this is to facilitate the erection or dismantling of the piston. After being attached to the crank, the piston can, when the crank is turned, be brought out of the vertical position into the horizontal position and then inserted into the cylinder at the end next the crank. In a similar manner the piston can be swung out and brought again into the vertical position for dismantling. The device described is particularly suitable for horizontal two-shaft opposed-piston internal combustion engines, since these have no cylinder cover, so that the only possibility of dismantling the piston is by removing it through the crank space.

The introduction of the piston into the cylinder and its removal from the cylinder can be further facilitated by the provision of a removable bush, which lengthens the cylinder running surface; it is put over the part of the piston carrying the rings and is assembled and dismantled simultaneously with the piston. The piston can then be held by means of the cylinder running surface before the connecting rod is detached from the crank, so that the piston can be inserted into the cylinder without requiring to be specially suspended from above or supported from below.

The invention is here explained with the help of the drawing in which Fig. 1 shows an example of execution of a two-shaft opposed-piston internal combustion engine according to the invention, with the pistons inserted ready for service, and Figs. 2 to 6 show a series of consecutive steps in dismantling a piston of the engine illustrated in Fig. 1.

The forces acting on the pistons 1 and 2 (Fig. 1) are transmitted through the connecting rods 3 and 4 to the cranks 5 and 6, and the pistons are drawn out further by the cranks in a manner not shown. From the scavenging-air duct 7 the scavenging air flows into the working cylinder through the port 8 which is controlled by the piston 2. The combustion gases pass through the port 9 into an exhaust pipe not shown. The crank casings 10 and 11 are rendered oil-tight by the sheet-metal covers 12 and 13. At the two ends of the cylinder running surface 14 extension bushes 15 and 16 are provided which are fixed to the running surface 14 by means of axial bolts 15' and 16' respectively.

For dismantling the piston 1 the sheet-metal cover 12 is removed and then the engine is turned around until crank 5 comes into the position shown in Fig. 2. At the big-end of the connecting rod 3 an eye-bolt 17 is provided which serves for suspending the connecting rod and then the big-end bearing cap is removed. After the connecting rod has come onto the edge of the extension bush 15, the crank 5 can be moved around into the chain-dotted position 5'.

The connecting rod 3 can then be withdrawn below the raised crank towards the front until it comes into the position shown in Fig. 3, whereby it rests for instance on the edge 18 of the piston. The crank 5 is then turned around from the position 5 past the forwardly drawn piston 1 into the position 5', so that the surfaces 19 of the crank cheek stand opposite to the piston.

After piston 1 has been drawn out to the end faces 19 of the crank cheeks as shown in Fig. 4, an axially-divided retaining bush 20 is laid over it, and the parts of the bush are then drawn together by means of tangential bolts. The bush, closed in this manner, can then be fixed to the end faces of the crank cheeks with the help of axial bolts 20'. At the same time the connecting rod 3 is held by a yoke 21 fixed to the crank cheeks, so that it can no longer be swung out. Between the connecting rod and the crank pin of soft material, for instance, lead, leather, or cardboard, may be inserted to protect the running surface.

The extension bush 15 is then detached from the cylinder running surface 14 and fixed by means of axial bolts 22' to the retaining bush 20, the pieces 22 (Fig. 5) being introduced between the running surface 14 and the bush 20. In addition to that, with the help of a yoke 23, which is likewise fixed with axial bolts 23' to the extension bush 15 and thereby also to the retaining bush 20 and to the crank cheeks, the piston 1 is prevented from sliding out backwards.

Finally the crank 5, with the piston fixed to the crank cheeks and with the connecting rod, is turned around into the position shown in Fig. 6. After fixed a dismantlnig rail 24 to the casing and removing the retaining bush 20, the piston can be slid out of the crankcase along the rail.

The operation of inserting the piston into the cylinder takes place in the contrary direction to the operation of dismantling. At first the piston, with the extension bush put over its rings, is set in the vertical position on the rail 24 and pushed into the crankcase, after which it is fixed to the crank by means of the retaining bush. After turning the crank into the horizontal position the extension bush can be fixed to the cylinder and the piston inserted into the cylinder.

I claim:

A two-shaft opposed-piston internal combustion engine having two pistons reciprocable horizontally in the same cylinder, which comprises a connecting rod connecting each piston to a crank-shaft, a removable bush connected to each end of the cylinder for lengthening the cylinder running surface of each piston, means for gripping each piston, and means for connecting the gripping means to the crank-shaft, whereby the piston may be swung with the crank-shaft after the bush has been disconnected from the cylinder.

HANS LIEBERHERR.